United States Patent
Clarke

(10) Patent No.: US 10,306,993 B1
(45) Date of Patent: Jun. 4, 2019

(54) TWO WAY CHAISE LOUNGE WITH SOLAR CHARGING STATION

(71) Applicant: Katrina Clarke, Orlando, FL (US)

(72) Inventor: Katrina Clarke, Orlando, FL (US)

(73) Assignee: 2 Way Chaise LLC, Maitland, FL (US)

( * ) Notice: Subject to any disclaimer, the term of this patent is extended or adjusted under 35 U.S.C. 154(b) by 0 days.

(21) Appl. No.: 16/058,812

(22) Filed: Aug. 8, 2018

Related U.S. Application Data

(60) Provisional application No. 62/620,818, filed on Jan. 23, 2018.

(51) Int. Cl.
*A47C 1/14* (2006.01)
*A47C 7/62* (2006.01)
*A47C 7/72* (2006.01)
*H02J 7/00* (2006.01)
*H02J 7/35* (2006.01)
*A47C 31/00* (2006.01)
*H02S 99/00* (2014.01)

(52) U.S. Cl.
CPC ............... *A47C 7/72* (2013.01); *A47C 1/143* (2013.01); *A47C 7/626* (2018.08); *A47C 31/00* (2013.01); *H02J 7/355* (2013.01); *H02S 99/00* (2013.01); *H02J 2007/0062* (2013.01)

(58) Field of Classification Search
CPC ........... A47C 7/72; A47C 1/143; A47C 7/626; A47C 31/00; H02S 99/00; H02J 7/355; H02J 7/0052; H02J 2007/0062
USPC ................................ 297/188.1, 217.3, 188.11
See application file for complete search history.

(56) References Cited

U.S. PATENT DOCUMENTS

| | | | | |
|---|---|---|---|---|
| 3,379,471 | A * | 4/1968 | Dalziel | A47C 17/16 114/363 |
| 5,975,630 | A * | 11/1999 | Schreiber | A47C 1/14 297/217.3 |
| 7,207,622 | B2 * | 4/2007 | Cohan | A47C 1/143 297/22 |
| 7,553,174 | B2 * | 6/2009 | Roepke | H01R 13/72 439/136 |
| 8,002,349 | B1 * | 8/2011 | Pizzuto | A47C 1/143 297/184.11 |
| 8,789,884 | B1 * | 7/2014 | Edelman | A47C 7/62 297/188.08 |
| 9,390,571 | B1 * | 7/2016 | Kupfer | A47C 7/72 |
| 9,808,087 | B1 * | 11/2017 | Ghazal | A47C 1/14 |
| 2002/0171335 | A1 * | 11/2002 | Held | A47B 77/08 312/223.6 |

(Continued)

*Primary Examiner* — Milton Nelson, Jr.
(74) *Attorney, Agent, or Firm* — Jason T. Daniel, Esq.; Daniel Law Offices, P.A.

(57) ABSTRACT

A two way chaise lounge includes a frame member that supports a seat having a head section, a leg section and an intermediate section. The head and leg sections are pivotally secured to the intermediate section and are individually adjustable so as to be positioned anywhere between a completely horizontal orientation and a completely vertical orientation. A drawer is positioned beneath the intermediate section and transitions between a closed position and an open position. The drawer includes a locking mechanism and a flat surface onto which a plurality of solar cells are located. A charging station is connected to the solar cells and includes a receptacle for engaging a power cord of a portable electronic device to provide the electrical power thereto.

6 Claims, 3 Drawing Sheets

(56) References Cited

U.S. PATENT DOCUMENTS

| | | | |
|---|---|---|---|
| 2012/0200129 A1* | 8/2012 | Wilson, Jr. | A47C 7/72 297/217.3 |
| 2014/0028242 A1* | 1/2014 | Akin | A45B 23/00 320/101 |
| 2016/0195921 A1* | 7/2016 | Evans | G06F 3/011 297/217.3 |

* cited by examiner

TWO WAY CHAISE LOUNGE WITH SOLAR CHARGING STATION

CROSS-REFERENCE TO RELATED APPLICATIONS

This application claims the benefit of U.S. Application Ser. No. 62/620,818 filed on Jan. 23, 2018, the contents of which are incorporated herein by reference.

TECHNICAL FIELD

The present invention relates generally to outdoor furniture, and more particularly to an improved chaise lounge system.

BACKGROUND

The statements in this section merely provide background information related to the present disclosure and may not constitute prior art.

Many outdoor gathering places such as backyard pools, beaches, hotel pools and cruise ships have one or more lounge style chairs for use when not swimming. These chairs often have one end that is adjustable, so as to allow a user to rest in a seated or flat lying position.

As mobile electronic devices such as mobile phones, electronic games and tablet computers have become prevalent throughout society, people often use such devices while enjoying the outdoor environment on a chaise lounge. Unfortunately, owing to the location of such chairs, it is uncommon to find any type of reliable power source to charge portable electronic devices. Therefore, when the power level of the user's device becomes low or exhausted, the user must typically leave the comfort of the lounge chair to find a power outlet.

Accordingly, it would be beneficial to provide a two way chaise lounge having an integrated solar powered charging station that can provide an electric charge for any type of portable electronic device.

SUMMARY OF THE INVENTION

The present invention is directed to a two way chaise lounge. One embodiment of the present invention can include a frame member for supporting a seat having a head section, a leg section and an intermediate section. The head and leg sections can be pivotally secured to the intermediate section and can be individually adjustable so as to be positioned anywhere between a completely horizontal orientation and a completely vertical orientation.

A drawer can be positioned beneath the intermediate section and can slide from a closed position to an open position. The drawer can include a mechanical and/or electromechanical locking mechanism and can receive a plurality of solar cells. A charging station can be positioned along the drawer and can include at least one receptacle or power cord for engaging a portable electronic device so as to provide electrical power thereto.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described herein, the term "removably secured" and derivatives thereof shall be used to describe a situation wherein two or more objects are joined together in a non-permanent manner so as to allow the same objects to be repeatedly joined and separated. This can be accomplished through the use of any number of commercially available connectors such as opposing strips of hook and loop material (i.e. Velcro®), magnets, and/or compression fittings such as locking pins, clamps, nut/bolts, tethers (e.g., zip ties), snaps and buttons, for example.

Moreover, the term "permanently secured" shall be used to describe a situation wherein two or more objects are joined together in a manner so as to prevent the same objects from being separated. Several nonlimiting examples include various adhesives such as glue or resin, hardware such as nuts and bolts, and welds, for example.

Figure 1:
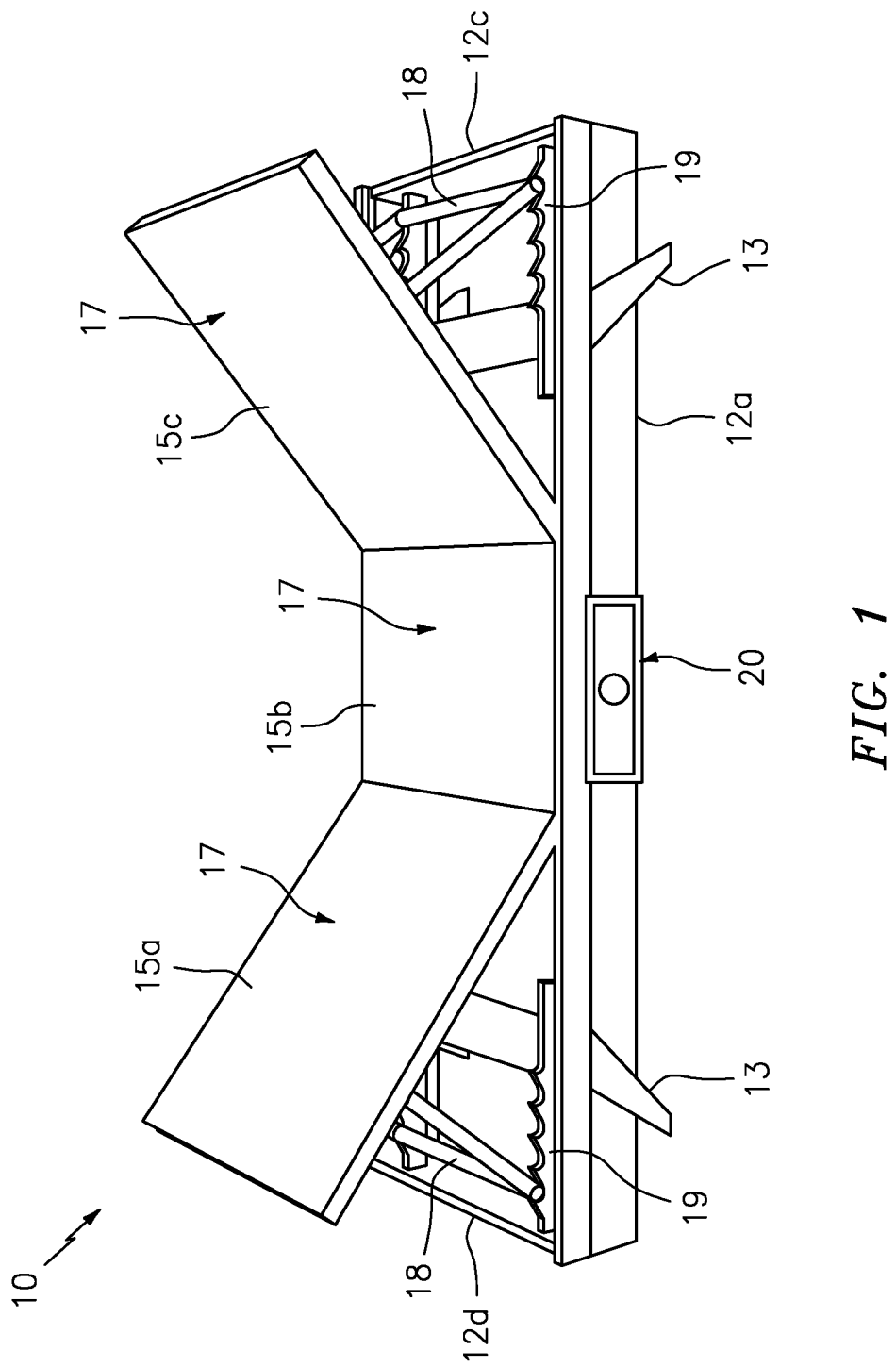
FIG. 1 is a side view of a two way chaise lounge with a solar charging station that is useful for understanding the inventive concepts disclosed herein.
Figure 2:
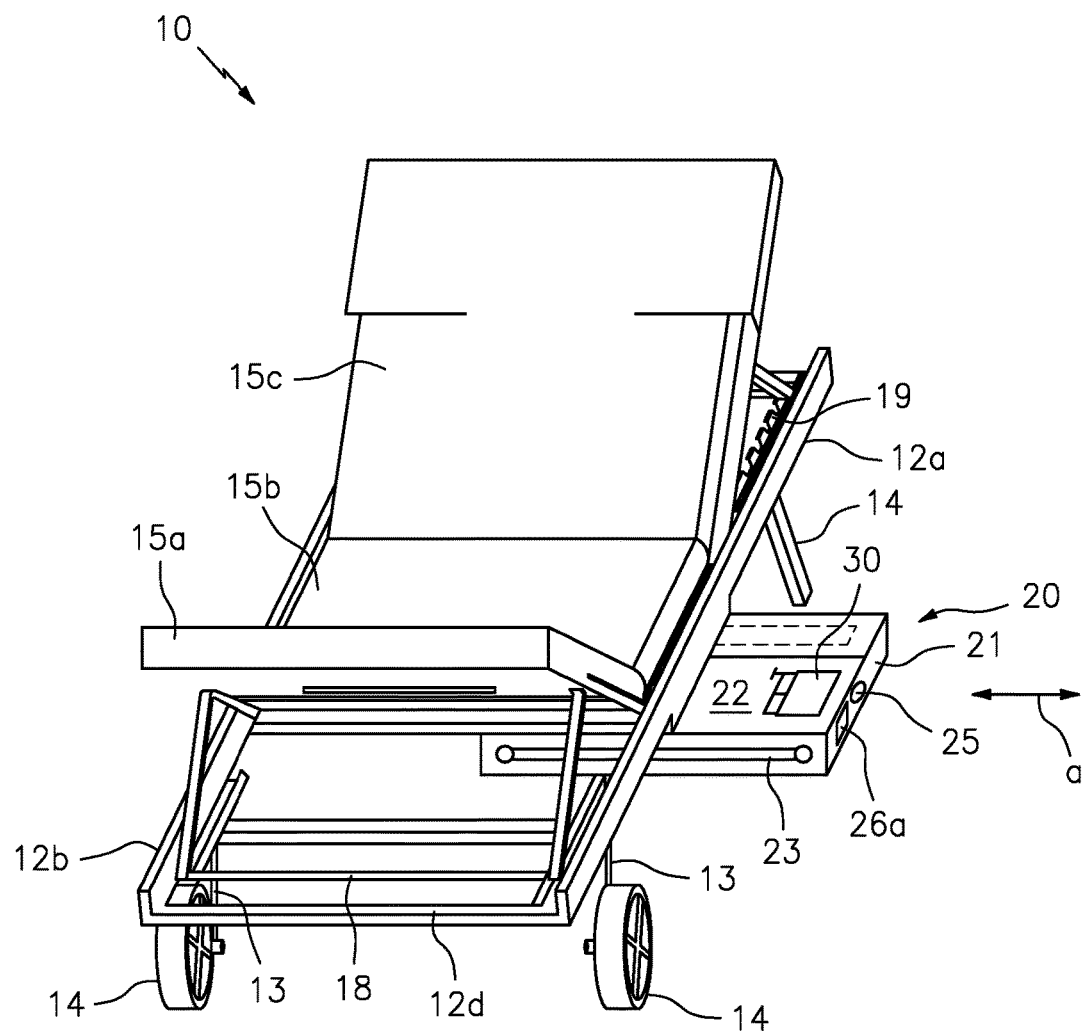
FIG. 2 is a perspective view of a two way chaise lounge with a solar charging station, in accordance with one embodiment of the invention.
Figure 3:
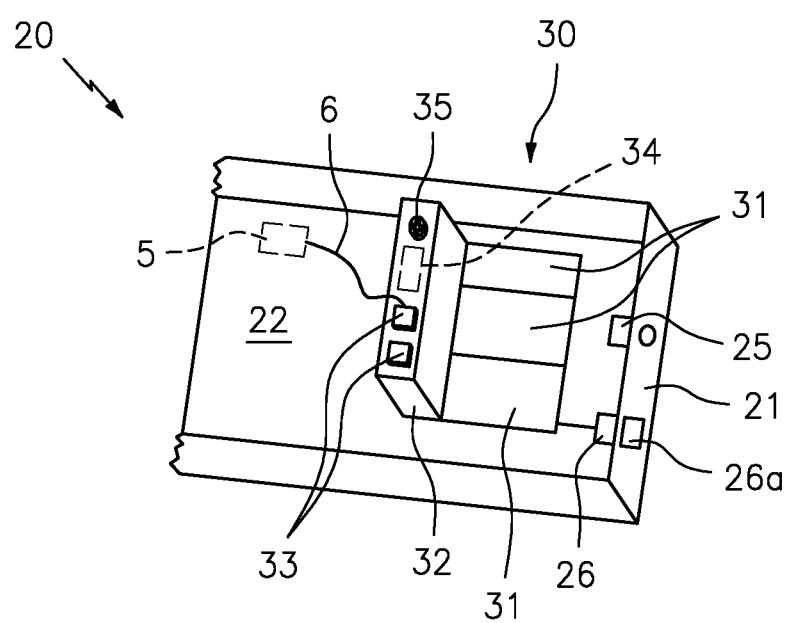
FIG. 3 is a cutout view of the drawer of the two way chaise lounge with a solar charging station, in accordance with one embodiment of the invention.

FIGS. 1-3 illustrate one embodiment of a chaise lounge with an integrated solar charging system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown, the chaise lounge 10 can include an elongated frame comprising side members 12a and 12b that are joined with end members 12c and 12d in a fixed relationship. A plurality of legs 13 can be secured to the bottom end of the frame and can include wheels 14, which may be permanently or removably secured to two or more of the legs in order to enable easy movement of the lounge. The frame and legs can be constructed from any number of different materials such as wood, plastic or metal, for example.

The lounge 10 can include a head section 15a, an intermediate section 15b and a leg section 15c. Each of these sections can include an integrated frame member or other structural support onto which a seating surface 17 can be positioned. As described herein, the seating surface can include any number of different materials such as plastic, stretched nylon, various forms of foam padding, wicker and/or other materials as are commonly utilized in the art. In various embodiments, one or more removable pillows having a pocket area that is can be positioned over the distal end of the head and leg sections can be provided.

As shown, one end of each of the head 15a and leg 15c sections are pivotally secured to both ends of the intermediate section 15b via hinges or other such devices, in order to allow the head and leg sections to independently move between a vertical and horizontal orientation. The second end of each of the head and leg sections can include a pivotally mounted engagement member 18 which can engage a series of grooves 19 along the side frame members 12a and 12b, in order to allow for several positions of adjustment in a known manner. Of course, any number of other known devices and mechanisms capable of securing the head and leg sections in two or more different positions are also contemplated. In this regard, both the head and leg sections can be independently oriented at any number of positions ranging from fully horizontal to fully upright.

As shown best in FIGS. 2 and 3, the chaise lounge 10 can include a drawer 20 having a raised outer surface 21 and a flat central portion 22. The drawer can be secured to the bottom of the lounge frame via rails 23, in order to allow the drawer to slide between an open and closed orientation shown by arrow a. In one embodiment, the drawer can include an integrated mechanical locking mechanism 25, such as a key or combination-style lock that can function to secure the drawer 20 in the closed position when engaged. Such a feature can be particularly beneficial when the lounge is to be utilized at a resort or cruise ship, for example, as it allows users to secure valuables against theft. In the open position, the flat surface of the drawer is designed to function as a table onto which food, drinks and/or personal belongings can be positioned for easy grasp by a person sitting in the lounge.

Alternatively, or in addition to the mechanical lock 25, the lounge 10 can also include an electromechanical locking unit 26 (See FIG. 3) which can lock and unlock the drawer when engaged by a key card, or other such device. To this end, the unit can include an NFC or RFID interface 26a, and/or other form of communication device. In various embodiments, the electromechanical unit 26 can include one or more processors, memory, transceiver and power source, and/or can be connected to the below described solar charging station in order to receive power therefrom.

In either instance, the locking unit 26 can be used, for example, in a cruise ship or resort environment, so as to allow users to lock, unlock and/or rent the chaise lounge 10 utilizing their issued key cards and/or cellular telephone device, for example. The transceiver can communicate the purchase and/or other information with a central computer at the resort, in order to allow the resort to manage use of the lounges.

As shown best at FIG. 3, a solar powered charging station 30 can be removably or permanently positioned along or within the drawer 20 and can function to provide power to a portable electronic device 5. To this end, the solar powered charging station can include a plurality of solar panels 31 that are connected to a charge interface 32. In the preferred embodiment, each of the solar panels can comprise mono crystalline silicone cells that are laminated with weatherproof shields, such as tempered glass, for example, that produce an electrical output of 12 volts at 20 watts. Of course, any type or number of solar panels and/or photovoltaic cells capable of converting sunlight into electricity can also be utilized herein.

The charge interface 32 can include any number of receptacles 33 that are connected to a charge controller 34 and/or one or more batteries. Each of the receptacles 33 can function to supply power to a portable electronic device 5, such as a smartphone, for example. In one embodiment, each of the receptacles can include, comprise or consist of a Universal Serial Bus (USB) connection port for receiving a conventional USB power plug 6, and providing direct current (DC) power thereto. Of course, other embodiments are contemplated wherein the receptacles include or comprise different types of ports for engaging power cables with configurations other than USB. To this end, any number or type of receptacles can be provided along the charge interface, so as to be able to provide power for one or more portable electronic devices or other such objects connected thereto.

As described herein, the charge controller 34 of the charging station can be electrically connected to the solar panels, the batteries and the receptacles. The charge controller can include any number of charge regulating circuits capable of maintaining a steady voltage to be output by the receptacles. In one embodiment, the charge controller can function to automatically sense the voltage requirements of a connected user device and can automatically adjust the output DC voltage of the receptacle to the necessary voltage. Such a feature advantageously allows users to charge one or more devices having different power requirements.

In one embodiment, the charge controller can also include an inverter that is connected to one or more A/C power outlets 35, in order to provide alternating current thereto. To this end, the controller can also include functionality for performing wireless or induction charging of a portable device by including a pair of induction coils capable of generating an electromagnetic field that transfers energy from the controller to a portable electronic device, without requiring the portable device to be physically plugged in.

As described herein, one or more elements of the chaise lounge 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

Although illustrated with regard to a single person chaise lounge, this is for illustrative purposes only. To this end, other embodiments are contemplated wherein the chaise can be constructed to comfortably fit two or more users at a single time.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A chaise lounge, comprising:
   an elongated frame member;
   a plurality of legs coupled to and extending below the frame member;
   a seat comprising an intermediate section, a head section that is pivotally connected to a first end of the intermediate section, and a leg section that is pivotally connected to a second end of the intermediate section;
   a drawer that is slidingly engaged to a bottom portion of the frame member at a location beneath the intermediate section;
   a charging station having a plurality of solar panels and at least one receptacle, said charging station being removably positioned along an inside portion of the drawer; and
   a lock that is integrated into the drawer and is configured to secure the drawer in a closed position, said lock comprising an electromechanical locking mechanism having a connector for engaging a communication wire extending from the charging station that is removably positioned within the drawer.

2. The chaise lounge of claim 1, further comprising:
   a charge controller that is electrically connected to each of the plurality of solar panels and the at least one receptacle, said charge controller including functionality for generating an electromagnetic field for conducting wireless induction charging of a portable electronic device that is positioned within the drawer.

3. The chaise lounge of claim 1, wherein the at least one receptacle includes a universal serial bus connection port that is configured to discharge electrical direct current.

4. The chaise lounge of claim 1, wherein the at least one receptacle includes a plurality of receptacles; and further comprising:
   a charge controller that is electrically connected to each of the plurality of solar panels and each of the plurality of receptacles, said charge controller including functionality for automatically detecting a voltage requirement of a plurality of electronic devices that are connected to each of the plurality of receptacles and regulating a different voltage output for each of the plurality of receptacles to match the detected voltage requirement of the electronic device connected to the respective outlet.

5. The chaise lounge of claim 1, further comprising:
   a charge controller that is electrically connected to each of the plurality of solar panels and the at least one receptacle, said charge controller including functionality for automatically detecting a voltage requirement of an electronic device connected to the at least one receptacle and regulating a voltage output of the at least one receptacle to match the detected voltage requirement.

6. The chaise lounge of claim 5, further comprising:
   a direct current to alternating current power inverter that is in communication with the plurality of solar panels,
   wherein at least one of the plurality of receptacles includes an alternating current power outlet.

* * * * *